United States Patent
Simonds et al.

(10) Patent No.: US 10,619,498 B2
(45) Date of Patent: Apr. 14, 2020

(54) FAN EXIT STATOR ASSEMBLY

(71) Applicant: United Technologies Corporation, Farmington, CT (US)

(72) Inventors: Mark E. Simonds, Cape Neddick, ME (US); Rahul Kuwar, Jalgaon (IN); Aniket Katti, Hyderabad (IN); Sridhar Bagathi, Hyderabad (IN); Raghavan Kotur, Secunderabad (IN)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 287 days.

(21) Appl. No.: 15/697,071

(22) Filed: Sep. 6, 2017

(65) Prior Publication Data
US 2019/0071988 A1    Mar. 7, 2019

(51) Int. Cl.
*F01D 9/04* (2006.01)
*F04D 29/54* (2006.01)
*F02C 3/04* (2006.01)

(52) U.S. Cl.
CPC ............... *F01D 9/042* (2013.01); *F02C 3/04* (2013.01); *F04D 29/542* (2013.01); *F05D 2220/323* (2013.01); *F05D 2220/36* (2013.01); *F05D 2230/60* (2013.01); *F05D 2240/128* (2013.01)

(58) Field of Classification Search
CPC ...................................................... F01D 9/042
See application file for complete search history.

(56) References Cited

U.S. PATENT DOCUMENTS

| 5,399,069 | A | * | 3/1995 | Marey | F01D 9/042 |
| | | | | | 415/189 |
| 6,409,472 | B1 | | 6/2002 | McMahon et al. | |
| 6,595,747 | B2 | | 7/2003 | Bos | |
| 8,206,100 | B2 | * | 6/2012 | Schuler | F01D 25/06 |
| | | | | | 415/119 |
| 10,190,426 | B2 | * | 1/2019 | Fremont | F01D 9/042 |
| 2017/0074110 | A1 | | 3/2017 | Fremont | |

FOREIGN PATENT DOCUMENTS

| EP | 3179046 | 6/2017 |
| FR | 3038351 | 1/2017 |
| GB | 2272027 | 5/1994 |
| WO | 2015132523 | 9/2015 |
| WO | 2016030608 | 3/2016 |

OTHER PUBLICATIONS

European Patent Office, European Search Report dated Feb. 11, 2019 in Application No. 18192113.1.

* cited by examiner

*Primary Examiner* — Igor Kershteyn
*Assistant Examiner* — Brian O Peters
(74) *Attorney, Agent, or Firm* — Snell & Wilmer L.L.P.

(57) ABSTRACT

A fan exit stator assembly of a gas turbine engine may include a radially inward shroud defining a first slot, a radially outward shroud, and a vane. The vane may include a base portion extending through the first slot and a tip portion coupled to the radially outward shroud. The vane may also include a retainer plate disposed radially inward of the radially inward shroud that projects in a circumferential direction from the base portion of the vane. A circumferential plate dimension of the retainer plate in the circumferential direction is greater than a first slot radius in the circumferential direction of the first slot, thus preventing radially outward movement of the vane relative to the radially inward shroud.

14 Claims, 6 Drawing Sheets

FAN EXIT STATOR ASSEMBLY

FIELD

The present disclosure relates to fan exit stator assemblies of gas turbine engines, and more specifically, to vane retention configurations in fan exit stator assemblies of gas turbine engines.

BACKGROUND

A gas turbine engine typically includes a fan section, a compressor section, a combustor section, and a turbine section. A fan section may drive air along a bypass flowpath while a compressor section may drive air along a core flowpath. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads. The compressor section typically includes low pressure and high pressure compressors, and the turbine section includes low pressure and high pressure turbines.

Various sections of conventional gas turbine engines, such as the fan section and compressor section, often include blades and/or vanes that can be damaged by bird strikes and/or by foreign object debris. For example, conventional gas turbine engines generally include a fan exit stator assembly that includes a circumferential array of vanes. When the vanes of conventional fan exit stator assemblies come into contact with foreign object debris, the vanes may become disconnected from the surrounding structural shroud, thus compromising the structural integrity of the fan exit stator assembly.

SUMMARY

In various embodiments, the present disclosure provides a fan exit stator assembly of a gas turbine engine. The fan exit stator assembly may include a radially inward shroud defining a first slot, a radially outward shroud, and a vane having a base portion extending through the first slot and a tip portion coupled to the radially outward shroud. The vane may include a retainer plate disposed radially inward of the radially inward shroud. The retainer plate may project in a circumferential direction from the base portion of the vane. In various embodiments, a circumferential plate dimension of the retainer plate in the circumferential direction is greater than a first slot radius in the circumferential direction of the first slot. Accordingly, the retainer plate may be configured to engage a radially inward surface of the radially inward shroud adjacent to the first slot to prevent radially outward movement of the vane relative to the radially inward shroud.

In various embodiments, an elastomeric material is disposed between the retainer plate and the radially inward surface of the radially inward shroud. In various embodiments, the retainer plate projects circumferentially from opposing sides of the base portion of the vane, such that the circumferential plate dimension of the retainer plate in the circumferential direction is greater than a first slot diameter in the circumferential direction of the first slot. In various embodiments, the base portion of the vane defines a second slot, wherein the retainer plate extends circumferentially through the second slot. In various embodiments, the vane and the retainer plate are separate parts made from a same material.

In various embodiments, the vane includes a forward portion having a leading edge. The second slot may be defined in the forward portion of the vane. In various embodiments, the vane may include a tab protruding radially inward from the base portion of the forward portion of the vane, and the second slot may be disposed radially between the radially inward shroud and a radially inward edge of the tab. In various embodiments, the second slot is disposed in the tab. In various embodiments, an axial plate dimension in an axial direction of the retainer plate is between about 0.6 centimeters and about 5.0 centimeters. In various embodiments, the axial plate dimension is between about 1.3 centimeters and about 2.5 centimeters.

Also disclosed herein, according to various embodiments, is a method of assembling a gas turbine engine. The method may include coupling a tip portion of a vane to a radially outward shroud, inserting a base portion of the vane through a first slot defined in a radially inward shroud, and, after inserting the base portion of the vane through the first slot, inserting a retainer plate through a second slot defined in the base portion of the vane.

The method may further include, after inserting the retainer plate through the second slot, engaging the retainer plate against a radially inward surface of the radially inward shroud. Still further, the method may include, before engaging the retainer plate against the radially inward surface of the radially inward shroud, applying an elastomeric material between the retainer plate and the radially inward shroud. In various embodiments, the method includes, after inserting the base portion of the vane through the first slot, applying an elastomeric material between the vane and the first slot.

The forgoing features and elements may be combined in various combinations without exclusivity, unless expressly indicated herein otherwise. These features and elements as well as the operation of the disclosed embodiments will become more apparent in light of the following description and accompanying drawings.

Figure 1:
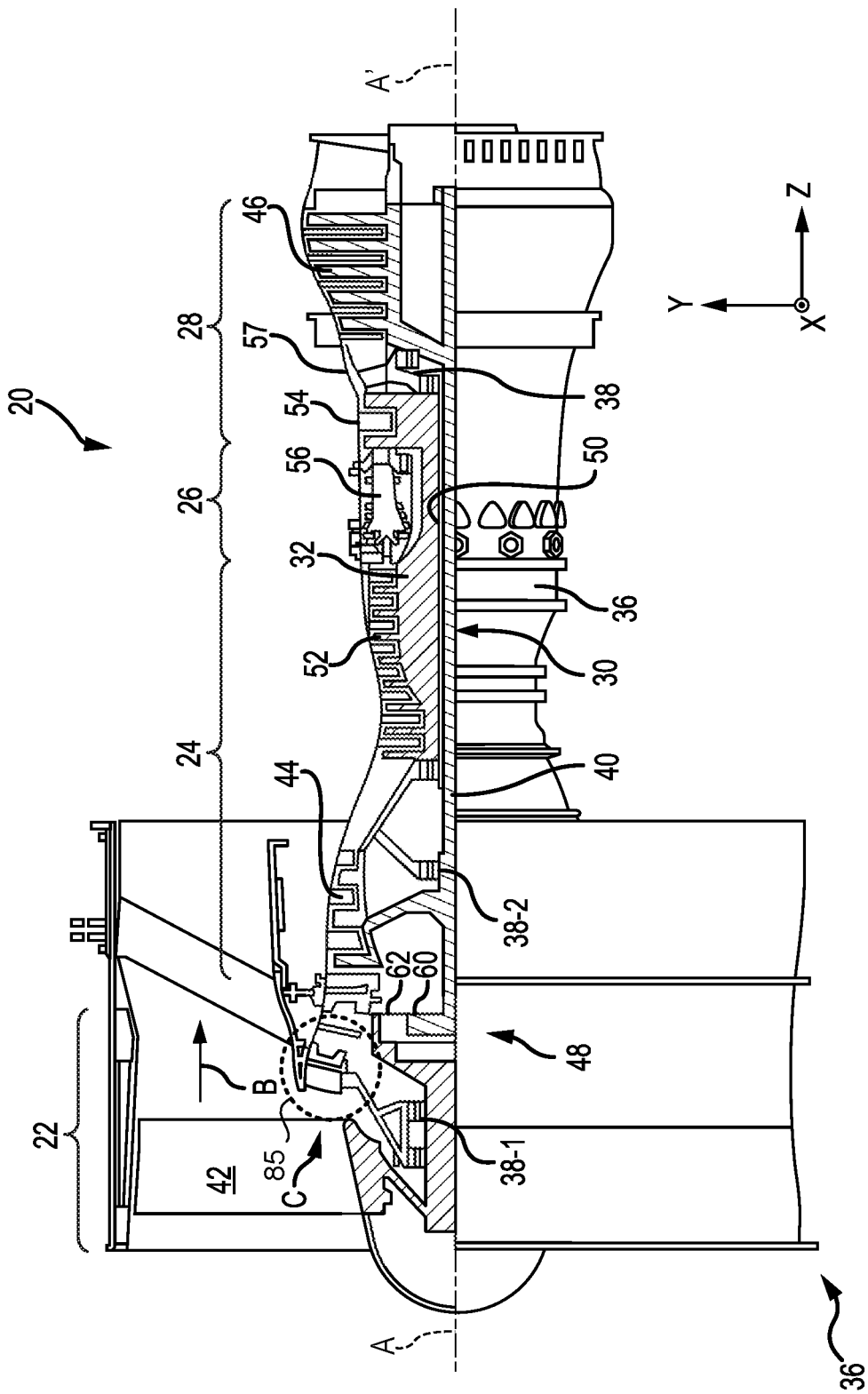
FIG. 1 illustrates a cross-sectional view of a gas turbine engine, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

As used herein, "aft" refers to the direction associated with the exhaust (e.g., the back end) of a gas turbine engine. As used herein, "forward" refers to the direction associated with the intake (e.g., the front end) of a gas turbine engine.

A first component that is "axially outward" of a second component means that a first component is positioned at a greater distance in the aft or forward direction away from the longitudinal center of the gas turbine along the longitudinal axis of the gas turbine, than the second component. A first component that is "axially inward" of a second component means that the first component is positioned closer to the longitudinal center of the gas turbine along the longitudinal axis of the gas turbine, than the second component.

A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. In the case of components that rotate circumferentially about the engine central longitudinal axis, a first component that is radially inward of a second component rotates through a circumferentially shorter path than the second component. The terminology "radially outward" and "radially inward" may also be used relative to references other than the engine central longitudinal axis. For example, a first component of a combustor that is radially inward or radially outward of a second component of a combustor is positioned relative to the central longitudinal axis of the combustor.

With reference to FIG. 1, a gas turbine engine 20 is shown according to various embodiments. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant (e.g., air) along a path of bypass airflow B while compressor section 24 can drive air along a core flowpath C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 or engine case via several bearing systems 38, 38-1, and 38-2. Engine central longitudinal axis A-A' is oriented in the z direction on the provided x-y-z axes. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The airflow of core flowpath C may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

Gas turbine engine 20 may be, for example, a high-bypass ratio geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared aircraft engine, such as a geared turbofan, or non-geared aircraft engine, such as a turbofan, or may comprise any gas turbine engine as desired.

Figure 2A:
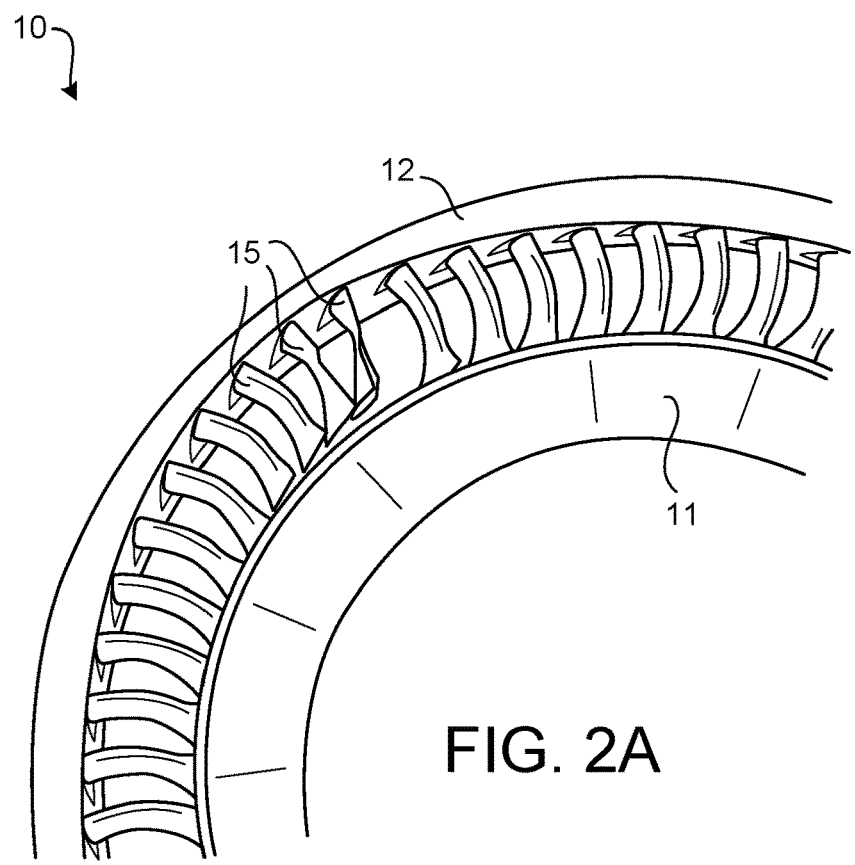
FIG. 2A illustrates an axial perspective view of a conventional fan exit stator assembly showing multiple vanes disconnected from a radially inward shroud, in accordance with various embodiments.
Figure 2B:
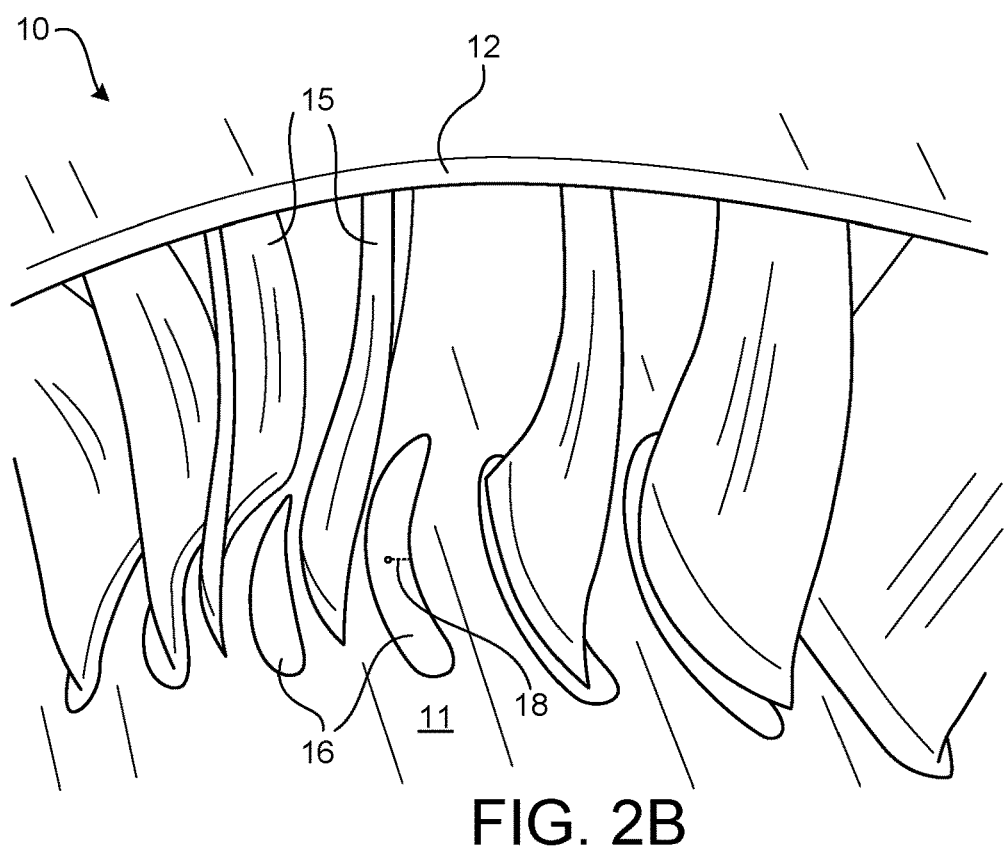
FIG. 2B illustrates a magnified view of vanes in a conventional fan exit stator assembly disconnected from the radially inward shroud, in accordance with various embodiments.

The fan section 22 of the gas turbine engine 20 may have a fan exit stator assembly. The fan exit stator assembly, shown generally as area 85 in FIG. 1, is configured downstream of the fan 42. In various embodiments, the fan exit stator assembly is disposed between the fan 42 and the compressor section 24. In various embodiments, air flows from the fan 42 through a circumferential array of vanes of the fan exit stator assembly and along core flowpath C. FIGS. 2A and 2B illustrate a conventional fan exit stator assembly 10 having one or more of the vanes 15 dislodged from the surrounding structural case. Various vanes 15 of the conventional fan exit stator assembly 10 are shown as being dislodged (e.g., at least partially disconnected) from the radially inward shroud 11 of the fan exit stator assembly 10. In the event of a bird strike or other contact from foreign object debris, conventional vanes 15 of conventional fan exit stator assemblies 10 are often susceptible to pull-out. That is, as shown in FIGS. 2A and 2B, the radially inward edge of conventional vanes 15 may break from the radially inward shroud 11. While these vanes 15 may not be completely disconnected from the surrounding structural case (i.e., the vanes 15 may still be connected to the radially outward shroud 12), the dislodged vanes 15 may compromise the structural integrity of the gas turbine engine, among other adverse effects.

Figure 3:
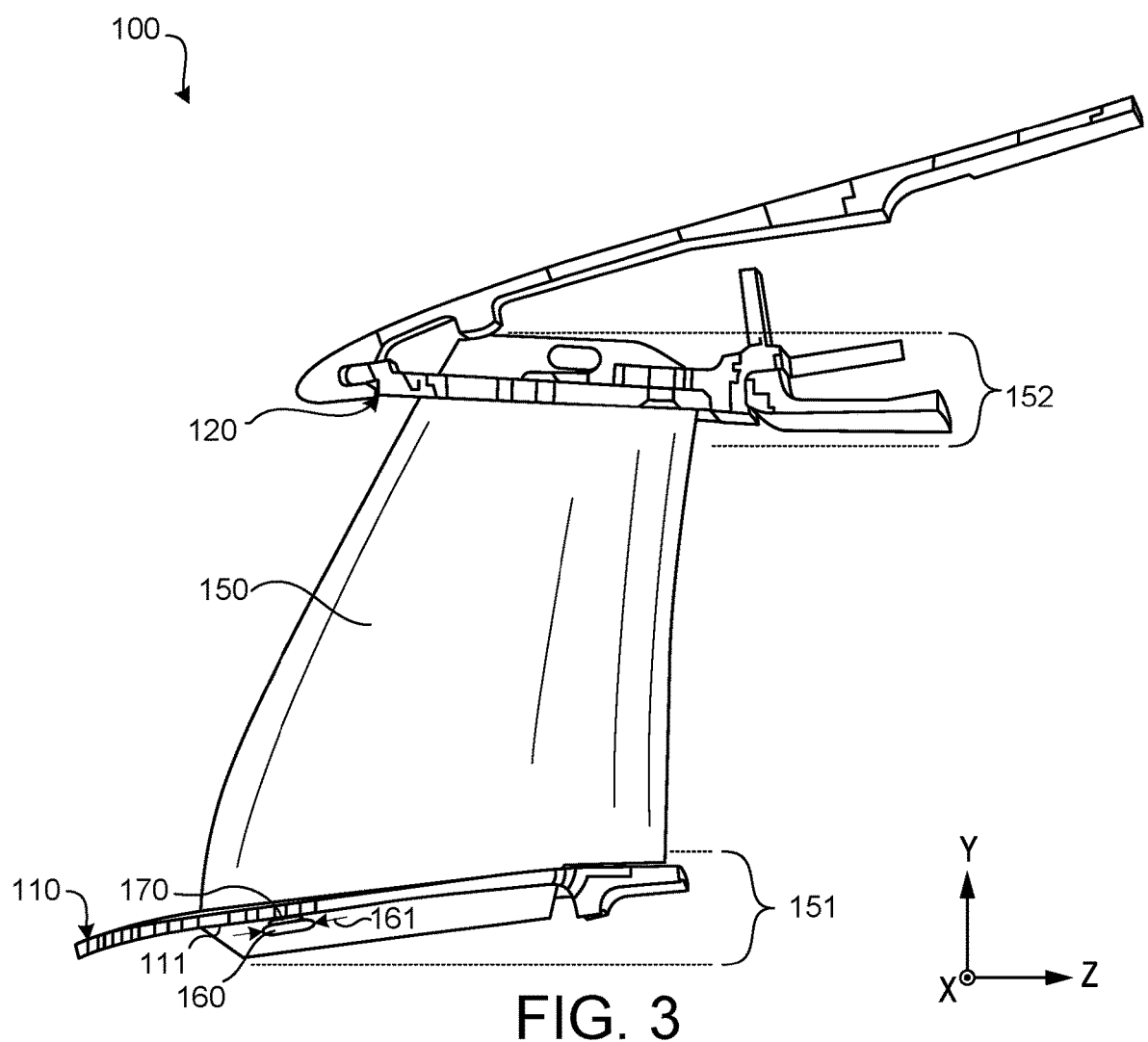
FIG. 3 is a cross-sectional view of a fan exit stator assembly having a vane retention configuration, in accordance with various embodiments.

In various embodiments, and with reference to FIG. 3, a fan exit stator assembly 100 is provided having a vane retention configuration that prevents, or at least inhibits or tends to inhibit, the vane 150 from becoming dislodged from the radially inward shroud 110. The fan exit stator assembly 100 disclosed herein, according to various embodiments, includes the radially inward shroud 110, a radially outward shroud 120, and vane 150. The radially inward shroud 110 may define a first slot (comparable to slot 16 defined in conventional radially inward shroud 11 of FIG. 2B) and a base portion 151 of the vane 150 may extend through the first slot. The vane 150 may also include a tip portion 152 that is coupled to the radially outward shroud 120. The fan exit stator assembly 100 also includes a retainer plate 160 disposed radially inward of the radially inward shroud 110.

Figure 4A:
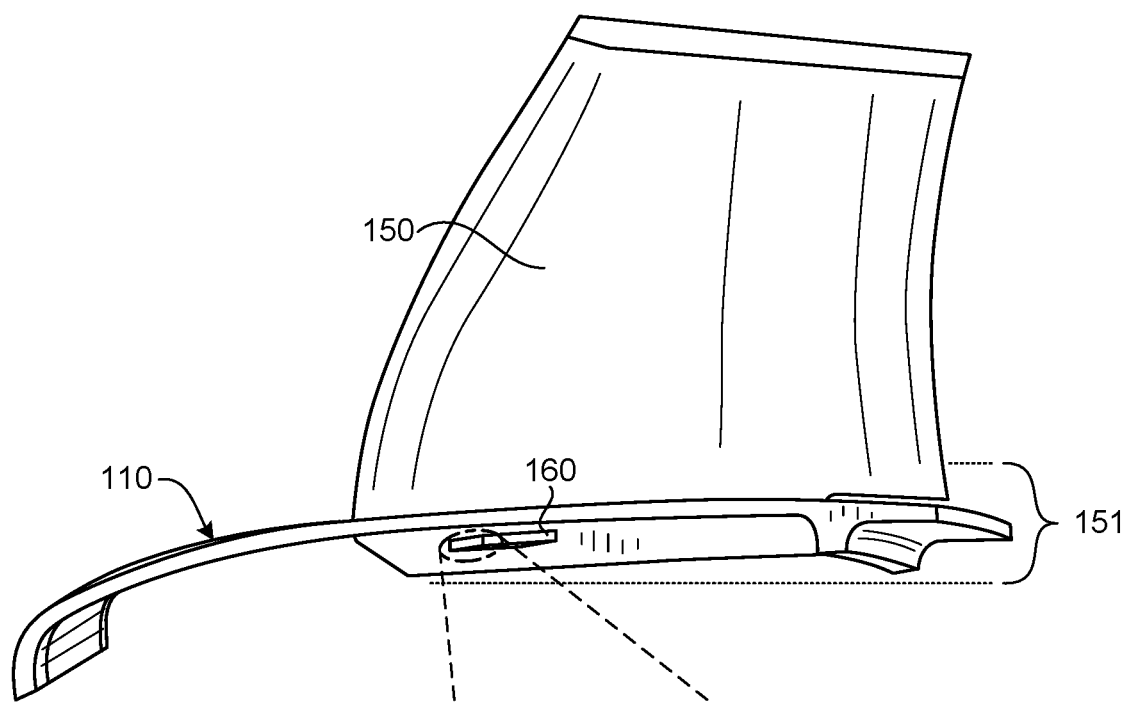
FIG. 4A is a perspective view of a fan exit stator assembly having a retention plate, in accordance with various embodiments.
Figure 4B:
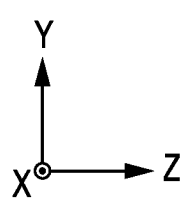
FIG. 4B is a magnified view of the retention plate, in accordance with various embodiments.
Figure 4B:
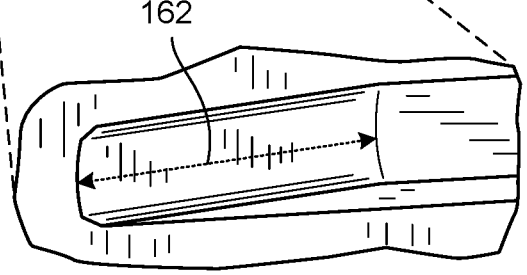

The retainer plate 160, as described in greater detail below with reference to FIGS. 4A and 4B, projects or protrudes, in a circumferential direction, from the base portion 151 of the vane 150. As used herein, the term "circumferential" (e.g., circumferential direction) refers generally to an orientation/direction along the x axis of the depicted x-y-z axes. The term "axial" (e.g., axial direction) refers generally to an orientation/direction along the z axis of the provided x-y-z axes and the term "radial" refers generally to an orientation/direction along the y axis of the provided x-y-z axes. Thus, the retainer plate 160 has a circumferential plate dimension, such as length 162 of FIG. 4B, that is greater than a first slot radius 18, in the circumferential direction, of the first slot (e.g., slot 16 of FIG. 2B). Accordingly, because the base portion 151 of the vane 150 extends through the first slot and because the circumferential dimension of the retainer plate 160 is greater than the corresponding dimension of the first slot defined in the radially inward shroud 110, radially outward movement of the vane 150, relative to the radially inward shroud 110, is prevented. Said differently, the vane is prevented from being pulled-out in a radially outward direction from the first slot of the radially inward shroud 110. Thus, vane 150, due to the retention provided by engagement of the retainer plate 160 with an underside (i.e., a radially inward surface 111) of the radially inward shroud 110 adjacent the first slot, is prevented or at least inhibited from becoming disconnected from the radially inward shroud 110 in the event of bird strike or in the event of contact with other foreign object debris.

In various embodiments, the retainer plate 160 extends circumferentially from opposing sides of the base portion 151 of the vane 150. For example, the retainer plate 160 may extend both in the positive x direction and in the negative x direction (into the page). In such embodiments, the overall circumferential dimension of the retainer plate 160 (which is twice the length 162 shown in FIG. 4B, plus the circumferential dimension of the base portion 151 of the vane 150 itself) is at least greater than a first slot diameter, in the circumferential direction, of the first slot defined in the radially inward shroud 110 (i.e., twice the radius 18 shown in FIG. 2B).

In various embodiments, and with continued reference to FIG. 3, an elastomeric material 170 may be disposed between the retainer plate 160 and the radially inward surface 111 of the radially inward shroud 110. Accordingly, before application of the elastomeric material 170, a gap may be defined between the radially inward surface 111 of the radially inward shroud 110 and the retainer plate 160. The elastomeric material 170, which may be silicone, natural rubber, synthetic rubber or other elastic-type substances, may facilitate retaining engagement between the retainer plate 160 and the radially inward shroud 110, and may have various damping benefits, according to various embodiments. An elastomeric material may also be applied within the first slot between the vane 150 and the radially inward shroud 110 to provide additional connection and damping benefits, according to various embodiments. In various embodiments, the radial thickness of the elastomeric material 170 is between about 0.5 millimeters (0.02 inches) and about 2.0 millimeters (0.08 inches). In various embodiments, the radial thickness of the elastomeric material 170 is about 1.0 millimeter (0.04 inches). As used in this context only, the term "about" means plus or minus 10% of the indicated value.

In various embodiments, the retainer plate 160 is a separate piece of material from the vane 150 and thus the retainer plate 160 may not be integrally formed with the vane 150. Thus, the retainer plate 160 may define a second slot 156, with reference to FIG. 5, through which the retainer plate 160 is configured to extend. For example, after inserting the base portion 151 of the vane 150 through the first slot defined in the radially inward shroud 110, the retainer plate 160 may be inserted, in a circumferential direction, into the second slot 156. The retainer plate 160 may be retained in the second slot 156 via adhesives, elastomeric materials, or an interference/resistive fit, among others. In various embodiments, the retainer plate 160 and the vane 150 are constructed from materials having similar mechanical stiffness properties to sustain structural integrity of the retaining load transfer path. In various embodiments, the retainer plate 160 and the vane 150 are constructed from the same material.

Figure 5:
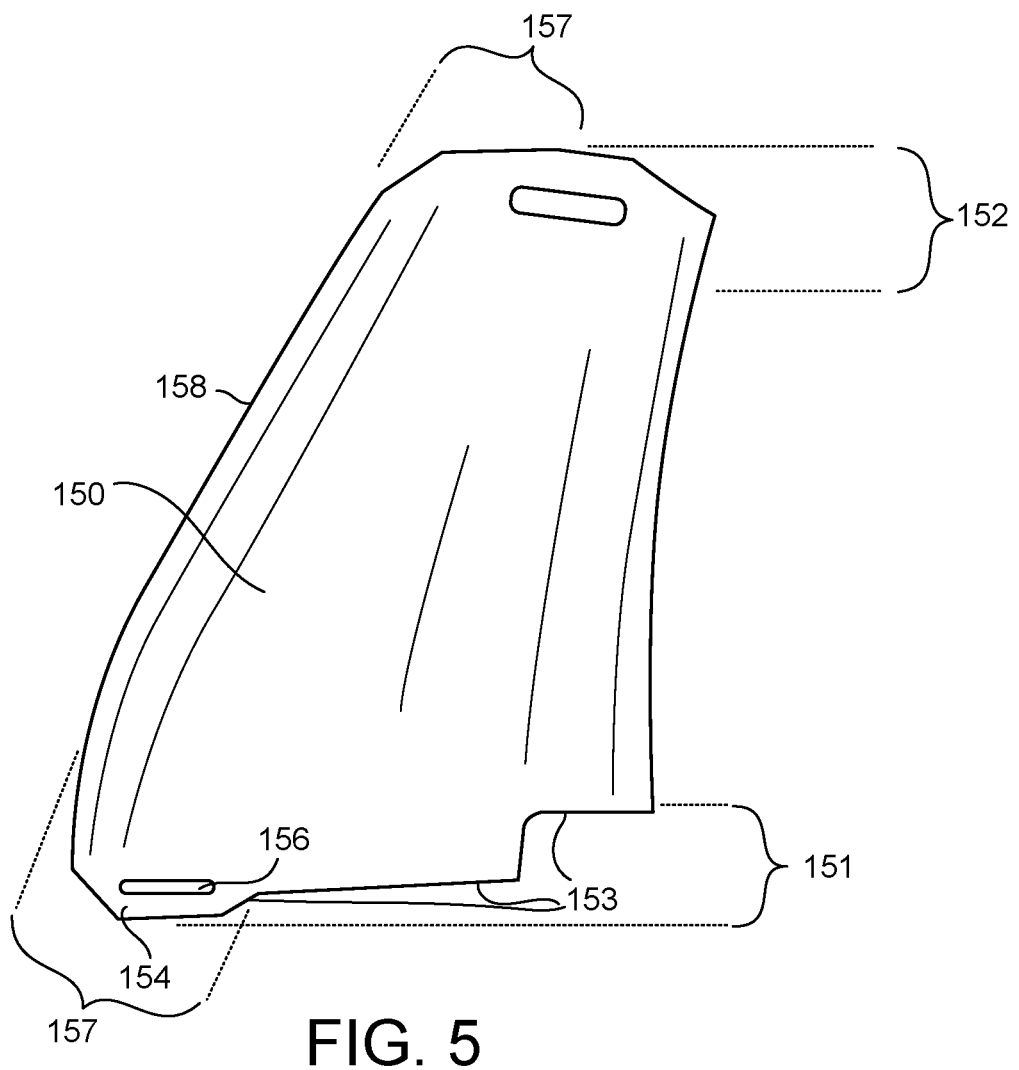
FIG. 5 is a view of a vane having a slot for receiving the retention plate, in accordance with various embodiments.

In various embodiments, and with reference to FIG. 5, the vane 150 includes a forward portion 157 having a leading edge 158. The second slot 156 may be defined in the forward portion 157 of the vane 150. Accordingly, the second slot 156 and thus the retainer plate 160 are disposed in a forward and radially inward section of the vane 150, according to various embodiments. In various embodiments, the vane 150 may include a tab 154 protruding radially inward from the base portion 151 of the forward portion 157 of the vane 150. Said differently, a forward section of the base edge 153 of the base portion 151 of the vane 150 may protrude radially inwards, thus helping the vane 150 to have sufficient structural strength (i.e., sufficient material) below (i.e., radially inward of) the second slot 156. In various embodiments, the second slot 156 is disposed radially between the radially inward shroud 110 and the base edge 153 (i.e., radially inward edge) of the tab 154. In various embodiments, the second slot 156 is located in the tab 154.

In various embodiments, and with reference to FIG. 3, an axial plate dimension 161 of the retainer plate 160 is between about 0.6 centimeters (0.25 inches) and about 5.0 centimeters (2.0 inches). In various embodiments, the axial plate dimension 161 of the retainer plate 160 is between about 1.3 centimeters (0.5 inches) and about 2.5 centimeters (1.0 inch). Correspondingly, a longitudinal dimension of the slot has substantially the same dimensions, perhaps marginally larger to enable the retainer plate 160 to be inserted there-through. As used in this context only, the term about means plus or minus 10% of the indicated value. Accordingly, the axial dimension of the retainer plate 160, together with the axial position of the retainer plate 160, contributes to the retaining strength of the fan exit stator assembly 100. For example, configuring the vane 150 to have the retainer plate 160 positioned in the forward portion 157 (FIG. 5) of the base portion 151 may inhibit the vane 150 from becoming disconnected from the radially inward shroud 110 in the event of a bird strike or other foreign object contact on the leading edge 158 (FIG. 5) of the vane 150.

Figure 6:
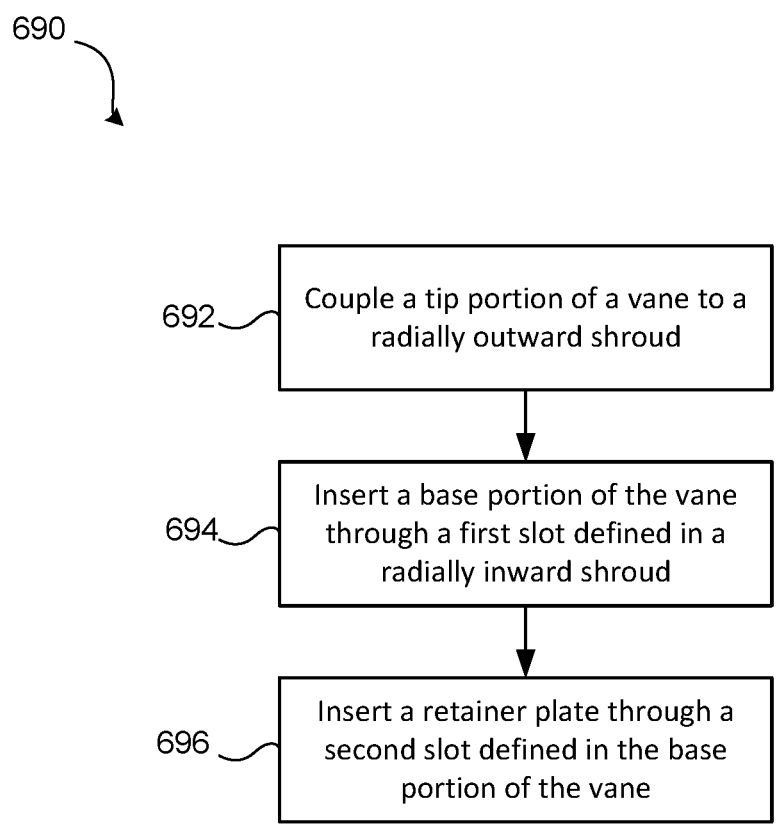
FIG. 6 is a schematic flow chart diagram of a method of assembling a gas turbine engine, in accordance with various embodiments.

In various embodiments, and with reference to FIG. 6, a method 690 of assembling a gas turbine engine is provided. The method 690 includes coupling a tip portion of a van to a radially outward shroud at step 692, according to various embodiments. The method 690 further includes inserting a base portion of the vane through a first slot defined in a radially inward shroud at step 694, according to various embodiments. The method 690 may also include inserting a retainer plate through a second slot defined in the base portion of the vane at step 696.

Step 696, according to various embodiments, is performed after step 694. Thus, the vane may be positioned relative to the radially inward shroud before the retainer plate is positioned relative to the vane. In various embodiments, the method 690 further includes, after step 696, engaging the retainer plate against a radially inward surface of the radially inward shroud. The method 690 may further include, before engaging the retainer plate against the radially inward surface of the radially inward shroud, applying an elastomeric material between the retainer plate and the radially inward shroud. In various embodiments, the method 690 further includes, after step 694, applying an elastomeric material between the vane and the first slot defined in the radially inward shroud.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A fan exit stator assembly of a gas turbine engine, the fan exit stator assembly comprising:
 a radially inward shroud defining a first slot;
 a radially outward shroud; and a vane comprising a base portion extending through the first slot and a tip portion coupled to the radially outward shroud, wherein the vane comprises a retainer plate disposed radially inward of the radially inward shroud and projects in a circumferential direction from the base portion of the vane, wherein a circumferential plate dimension of the retainer plate in the circumferential direction is greater than a first slot radius in the circumferential direction of the first slot;

wherein an elastomeric material is disposed between the retainer plate and a radially inward surface of the radially inward shroud; and wherein the elastomeric material is centered axially between respective axial ends of the retainer plate.

2. The fan exit stator assembly of claim 1, wherein the retainer plate is configured to engage the radially inward surface of the radially inward shroud adjacent the first slot to prevent radially outward movement of the vane relative to the radially inward shroud.

3. The fan exit stator assembly of claim 1, wherein the retainer plate projects circumferentially from opposing sides of the base portion of the vane, wherein the circumferential plate dimension of the retainer plate in the circumferential direction is greater than a first slot diameter in the circumferential direction of the first slot.

4. The fan exit stator assembly of claim 3, wherein the base portion of the vane defines a second slot, wherein the retainer plate extends circumferentially through the second slot.

5. The fan exit stator assembly of claim 4, wherein the vane and the retainer plate are separate parts made from a same material.

6. The fan exit stator assembly of claim 4, wherein the vane comprises a forward portion comprising a leading edge, wherein the second slot is defined in the forward portion of the vane.

7. The fan exit stator assembly of claim 6, wherein the vane comprises a tab protruding radially inward from the base portion of the forward portion of the vane, wherein the second slot is disposed radially between the radially inward shroud and a radially inward edge of the tab.

8. The fan exit stator assembly of claim 7, wherein the second slot is disposed in the tab.

9. The fan exit stator assembly of claim 6, wherein an axial plate dimension in an axial direction of the retainer plate is between 0.6 centimeters and 5.0 centimeters.

10. The fan exit stator assembly of claim 9, wherein the axial plate dimension is between 1.3 centimeters and 2.5 centimeters.

11. A method of assembling a gas turbine engine, the method comprising:
coupling a tip portion of a vane to a radially outward shroud;
inserting a base portion of the vane through a first slot defined in a radially inward shroud;
after inserting the base portion of the vane through the first slot, inserting a retainer plate through a second slot defined in the base portion of the vane; and
disposing an elastomeric material between the retainer plate and the radially inward shroud such that the elastomeric material is centered axially between respective axial ends of the retainer plate.

12. The method of claim 11, further comprising, after inserting the retainer plate through the second slot, engaging the retainer plate, via the elastomeric material, against a radially inward surface of the radially inward shroud.

13. The method of claim 12, further comprising, before engaging the retainer plate against the radially inward surface of the radially inward shroud, applying the elastomeric material between the retainer plate and the radially inward shroud.

14. The method of claim 11, further comprising, after inserting the base portion of the vane through the first slot, applying the elastomeric material between the vane and the first slot.

* * * * *